US010005934B2

(12) United States Patent
Himmelberger et al.

(10) Patent No.: US 10,005,934 B2
(45) Date of Patent: Jun. 26, 2018

(54) EXTRUDABLE ADHESIVE FORMULATIONS CONTAINING OLEFIN BLOCK COPOLYMERS

(71) Applicant: Rohm and Haas Company, Philadelphia, PA (US)

(72) Inventors: Daniel W. Himmelberger, Green Lane, PA (US); William B. Griffith, Jr., North Wales, PA (US)

(73) Assignee: Rohm and Haas Company, Collegeville, PA (US)

( * ) Notice: Subject to any disclaimer, the term of this patent is extended or adjusted under 35 U.S.C. 154(b) by 0 days. days.

(21) Appl. No.: 14/779,166

(22) PCT Filed: Apr. 10, 2014

(86) PCT No.: PCT/US2014/033622
§ 371 (c)(1),
(2) Date: Sep. 22, 2015

(87) PCT Pub. No.: WO2014/172179
PCT Pub. Date: Oct. 23, 2014

(65) Prior Publication Data
US 2016/0053143 A1    Feb. 25, 2016

Related U.S. Application Data

(60) Provisional application No. 61/813,463, filed on Apr. 18, 2013.

(51) Int. Cl.
*C08L 53/00*   (2006.01)
*C09J 153/00*  (2006.01)
*C08J 5/00*    (2006.01)

(52) U.S. Cl.
CPC .............. *C09J 153/00* (2013.01); *C08J 5/00* (2013.01); *C08L 53/00* (2013.01); *C08J 2323/08* (2013.01)

(58) Field of Classification Search
None
See application file for complete search history.

(56) References Cited

U.S. PATENT DOCUMENTS

| | | |
|---|---|---|
| 5,266,399 A | 11/1993 | Babu et al. |
| 5,286,781 A | 2/1994 | Gotoh et al. |
| 5,397,648 A | 3/1995 | Babu et al. |
| 5,643,676 A | 7/1997 | Dobashi et al. |
| 6,878,440 B1 | 4/2005 | Yamanaka et al. |
| 7,524,911 B2 | 4/2009 | Karjala et al. |
| 7,608,668 B2 | 10/2009 | Li Pi Shan et al. |
| 7,858,706 B2 | 12/2010 | Arriola et al. |
| 7,893,166 B2 | 2/2011 | Shan et al. |
| 7,947,793 B2 | 5/2011 | Marchand et al. |
| 7,989,543 B2 | 8/2011 | Karjala et al. |
| 8,222,339 B2 | 7/2012 | Yalvac et al. |
| 2006/0199911 A1* | 9/2006 | Markovich ......... C08L 23/0815 525/192 |
| 2011/0021103 A1* | 1/2011 | Alper ........................ B32B 5/26 442/329 |
| 2011/0213067 A1 | 9/2011 | Moeller et al. |
| 2012/0165455 A1* | 6/2012 | Vitrano ................... C08L 23/06 524/505 |

FOREIGN PATENT DOCUMENTS

| | | |
|---|---|---|
| WO | 2009/030802 A2 | 3/2009 |
| WO | 2011011729 A1 | 1/2011 |
| WO | 2012/129489 A2 | 9/2012 |
| WO | 2013/019507 A2 | 2/2013 |
| WO | 2014/172178 A1 | 10/2014 |
| WO | 2015/026701 A1 | 2/2015 |

OTHER PUBLICATIONS

Choi, Aromatic Polycarbodiimides: Crosslinkers for Water Based Adhesives, presented at PSTC, 2003, Washington D.C., Powerpoint.
Choi, Aromatic Polycarbodiimides: Crosslinkers for Water Based Adhesives, presented at PSTC, May 2003, Washington D.C., Paper.
PCT/US2014/033622, Jul. 31, 2014, International Search Report and Written Opinion.
PCT/US2014/033622, Oct. 29, 2015, International Preliminary Report on Patentability.
Lipishan, Development of Olefin Block Copolymers for Pressure Sensitive Adhesive, Li Pi Shan et al., adapted from paper presented at PSTC, May 16-18, 2007, Orlando, Florida.

* cited by examiner

Primary Examiner — Robert C Boyle

(57) ABSTRACT

The invention provides a composition comprising the following components: A) an ethylene/alpha-olefin block copolymer; B) a tackifies; and wherein the composition has a melt index (I2) from 1 to 50 g/10 min and an I10/I2 ratio from 7.5 to 13.

15 Claims, No Drawings

EXTRUDABLE ADHESIVE FORMULATIONS CONTAINING OLEFIN BLOCK COPOLYMERS

REFERENCE TO RELATED APPLICATIONS

This application claims the benefit of U.S. Provisional Application No. 61/813,463, filed on Apr. 18, 2013.

BACKGROUND

Flexible packaging, such as protective wraps, cohesive fasteners and resealable films, require good adhesion and the proper rheology for good extrusion processing. Conventional protective wraps, for example automotive wraps, are often formed using costly solvent-based technologies. Cohesive fasteners and resealable films are often formed using complex multi-step processes. There is a need for new adhesive compositions that can be extruded onto other substrates, without the need for a solvent, and which have good tunable adhesion and the proper rheology for extrusion processing.

Adhesive formulations are disclosed in the following references: U.S. Pat. Nos. 8,222,339, 7,989,543, 7,524,911; U.S. Publication 20120165455; and *Development of Olefin Block Copolymers for Pressure Sensitive Adhesive*, Li Pi Shan et al., adapted from paper presented at PSTC, May 16-18, 2007, Orlando, Fla.

However, as discussed above, there is a need for new adhesive compositions that can be extruded onto other substrates using conventional film fabrication equipment, without the need for a solvent, and which have good adhesion and the proper rheology for extrusion processing. These needs have been met by the following invention.

SUMMARY

The invention provides a composition comprising the following components:
A) an ethylene/$\alpha$-olefin block copolymer;
B) a tackifier; and
wherein the composition has a melt index (I2) from 1 to 50 g/10 min and an I10/I2 ratio from 7.5 to 13.

DETAILED DESCRIPTION

As discussed above, the invention provides a composition comprising the following components:
A) an ethylene/$\alpha$-olefin block copolymer;
B) a tackifier; and
wherein the composition has a melt index (I2) from 1 to 50 g/10 min and an I10/I2 ratio from 7.5 to 13.

An inventive composition may comprise a combination of two or more embodiments as described herein.

Each component (e.g., A or B) of an inventive composition may comprise a combination of two or more embodiments as described herein.

In one embodiment, the composition has a melt index (I2) from 1 to 40 g/10 min, further from 1 to 30 g/10 min, further from 1 to 20 g/10 min.

In one embodiment, the composition has a melt index (I2) from 2 to 50 g/10 min, further from 3 to 50 g/10 min, further from 4 to 50 g/10 min, further from 5 to 50 g/10 min.

In one embodiment, the composition has an I10/I2 ratio from 7.6 to 13, further from 8 to 11.

In one embodiment, the composition has an I10/I2 ratio from 7.7 to 13, further from 8.0 to 12, further from 8.2 to 11.

In one embodiment, component A is present in an amount greater than, or equal to 50 weight percent, further greater than, or equal to 55 weight percent, further greater than, or equal to 60 weight percent, based on the weight of the composition.

In one embodiment, component A is present in an amount from 50 to 95 weight percent, further from 60 to 90 weight percent, further from 65 to 85 weight percent, further from 70 to 85 weight percent, based on the weight of the composition.

In one embodiment, component B is present in an amount from 5 to 30 weight percent, further from 7 to 25 weight percent, further from 9 to 20 weight percent, based on the weight of the composition.

In one embodiment, the composition further comprises component C) an oil. In a further embodiment, the oil is a mineral oil.

In one embodiment, component C is present in an amount from 2 to 25 weight percent, further from 4 to 20 weight percent, further from 6 to 15 weight percent, based on the weight of the composition.

In one embodiment, the composition has a density from 0.850 g/cc to 0.910 g/cc, further from 0.860 g/cc to 0.900 g/cc, further from 0.870 g/cc to 0.890 g/cc.

In one embodiment, the tackifier of Composition A has a softening temperature from 80° C. to 140° C., further from 85° C. to 135° C., further from 90° C. to 130° C., further from 90° C. to 125° C., as determined by Ring and Ball softening point (ASTM E 28).

In one embodiment, the tackifier of component B has a softening temperature from 80° C. to 120° C., further from 85° C. to 115° C., further 90° C. to 110° C., as determined by Ring and Ball softening point (ASTM E 28).

In one embodiment, the tackifier of component B is selected from the group consisting of the following: a non-hydrogenated aliphatic $C_5$ resin, a hydrogenated aliphatic $C_5$ resin, an aromatic modified $C_5$ resin, a terpene resin, a non-hydrogenated $C_9$ resin, a hydrogenated $C_9$ resin, or combinations thereof.

In one embodiment, the tackifier of component B is selected from the group consisting of the following: a non-hydrogenated aliphatic $C_5$ resin, a hydrogenated aliphatic $C_5$ resin, a non-hydrogenated $C_9$ resin, a hydrogenated $C_9$ resin, or combinations thereof.

In one embodiment, the amount of component A, in the composition, is greater than the amount of component B, in the composition.

In one embodiment, the composition has a 180° Peel Adhesion Force (according to PSTC 101, method A; N/in) from 1.0 to 10.0 N/in, further from 2.0 to 20.0 N/in.

In one embodiment, the composition has a 180° Peel Adhesion Force (according to PSTC 101, method A; N/in) from 0.4 to 14.0 N/in, further from 0.6 to 14.0 N/in, further from 0.8 to 14.0 N/in, further from 1.0 to 14.0 N/in.

In one embodiment, the composition has a glass transition temperature (Tg) from −70° C. to −20° C., further from −65° C. to −30° C., further from −62° C. to −40° C., as determined by DSC.

In one embodiment, the composition has a melting temperature (Tm) from 110° C. to 130° C., further from 112° C. to 125° C., further from 115° C. to 122° C., as determined by DSC.

In one embodiment, the composition has a crystallization temperature (Tc) from 100° C. to 120° C., further from 102° C. to 118° C., further from 104° C. to 115° C., as determined by DSC.

In one embodiment, the composition has a Delta H of crystallization from 15 J/g to 35 J/g, further from 16 J/g to 32 J/g, further from 17 J/g to 30 J/g, as determined by DSC.

In one embodiment, the composition has a storage modulus (G' at 25° C.) from $0.4 \times 10^7$ to $3.0 \times 10^7$ dyne/cm$^2$, further from $0.5 \times 10^7$ to $2.5 \times 10^7$ dyne/cm$^2$, further from $0.5 \times 10^7$ to $2.0 \times 10^7$ dyne/cm$^2$, as determined by DMS.

The invention also provides an article comprising at least one component formed from an inventive composition.

In one embodiment, the article is selected from a film or a hygiene absorbent product (for example, a diaper).

In one embodiment, the article is an automotive protective wrap.

An inventive composition may comprise a combination of two or more embodiments as described herein.

Component A of an inventive composition may comprise a combination of two or more embodiments as described herein.

Component B of an inventive composition may comprise a combination of two or more embodiments as described herein.

Component C of an inventive composition may comprise a combination of two or more embodiments as described herein.

An inventive article may comprise a combination of two or more embodiments as described herein.

It has been discovered that the inventive compositions can be used as coextruded adhesives, and provide both cost savings and reduced environmental waste. The inventive compositions can be used to form "lower cost to manufacture" articles of simple constructions, and which do not require the use of solvents in their manufacturing processes. The inventive compositions can also be used, in place of styrenic-based compositions, in laminations and cohesive applications, such as protective wraps and reclosable packaging, to reduce odor, color, and costs associated with styrenic-based compositions. The inventive compositions are easily extrudable/processable and can be pelletized.

A. Ethylene/α-Olefin Block Copolymer

As used herein, the terms "ethylene/α-olefin block copolymer," "olefin block copolymer," or "OBC," mean an ethylene/α-olefin multi-block copolymer, and includes ethylene and one or more copolymerizable α-olefin comonomer in polymerized form, characterized by multiple blocks or segments of two or more polymerized monomer units, differing in chemical or physical properties. The terms "interpolymer" and "copolymer" are used interchangeably, herein, for the term ethylene/α-olefin block copolymer, and similar terms discussed in this paragraph. When referring to amounts of "ethylene" or "comonomer" in the copolymer, it is understood that this means polymerized units thereof. In some embodiments, the multi-block copolymer can be represented by the following formula:

(AB)$_n$, where n is at least 1, preferably an integer greater than 1, such as 2, 3, 4, 5, 10, 15, 20, 30, 40, 50, 60, 70, 80, 90, 100, or higher; "A" represents a hard block or segment; and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows:

AAA-AA-BBB-BB.

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms. In some embodiments, the olefin block copolymer may comprise 50 mol % to 90 mol % ethylene, preferably 60 mol % to 85 mol %, more preferably 65 mol % to 80 mol %. For many ethylene/octene block copolymers, the preferred composition comprises an ethylene content greater than 80 mole percent of the whole polymer and an octene content from 10 to 15, preferably from 15 to 20 mole percent of the whole polymer.

The olefin block copolymer includes various amounts of "hard" and "soft" segments. "Hard" segments are blocks of polymerized units, in which ethylene is present in an amount greater than 95 weight percent, or greater than 98 weight percent, based on the weight of the polymer, up to 100 weight percent. In other words, the comonomer content (content of monomers other than ethylene) in the hard segments is less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent, based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent, and can be up to 100 weight percent.

The soft segments can be present in an OBC from 1 weight percent to 99 weight percent of the total weight of the OBC, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the OBC. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Interpolymers," filed on Mar. 15, 2006, in the name of Colin L. P. Shan, Lonnie Hazlitt, et al., and assigned to Dow Global Technologies Inc., the disclosure of which is incorporated by reference herein in its entirety. In particular, hard and soft segment weight percentages and comonomer content may be determined as described in Column 57 to Column 63 of U.S. Pat. No. 7,608,668.

The olefin block copolymer is a polymer comprising two or more chemically distinct regions or segments (referred to as "blocks") preferably joined in a linear manner, that is, a polymer comprising chemically differentiated units, which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present OBC is characterized by unique distributions of both polymer polydispersity (PDI or Mw/Mn or MWD), block length distribution, and/or block number distribution, due, in an embodiment, to the effect of the shuttling agent(s) in combination with multiple catalysts used in their preparation.

In an embodiment, the OBC is produced in a continuous process and possesses a polydispersity index, PDI (or MWD), from 1.7 to 3.5, or from 1.8 to 3, or from 1.8 to 2.5, or from 1.8 to 2.2. When produced in a batch or semi-batch process, the OBC possesses PDI from 1.0 to 3.5, or from 1.3 to 3, or from 1.4 to 2.5, or from 1.4 to 2.

In addition, the olefin block copolymer possesses a PDI fitting a Schultz-Flory distribution rather than a Poisson distribution. The present OBC has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present olefin block copolymer possesses a most probable distribution of block lengths. In an embodiment, the olefin block copolymer is defined as having:

a) (A) Mw/Mn from 1.7 to 3.5, at least one melting point, Tm, in degrees Celsius, and a density, d, in grams/cubic centimeter, where in the numerical values of Tm and d correspond to the relationship:

$$Tm>-2002.9+4538.5(d)-2422.2(d)^2, \text{ and/or}$$

b) (B) Mw/Mn from 1.7 to 3.5, and is characterized by a heat of fusion, $\Delta H$ in J/g, and a delta quantity, $\Delta T$, in degrees Celsius, defined as the temperature difference between the tallest DSC peak and the tallest Crystallization Analysis Fractionation ("CRYSTAF") peak, wherein the numerical values of $\Delta T$ and $\Delta H$ have the following relationships:

$$\Delta T>-0.1299\Delta H+62.81 \text{ for } \Delta H \text{ greater than zero and up to 130 J/g}$$

$$\Delta T \geq 48° C. \text{ for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or c) (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re>1481-1629(d); \text{ and/or}$$

d) (D) has a molecular fraction which elutes between 40° C. and 130° C. when fractionated using TREF, characterized in that the fraction has a molar comonomer content greater than, or equal to, the quantity (−0.2013) T+20.07, more preferably greater than or equal to the quantity (−0.2013) T+21.07, where T is the numerical value of the peak elution temperature of the TREF fraction, measured in ° C.; and/or, e) (E) has a storage modulus at 25° C., G'(25° C.), and a storage modulus at 100° C., G'(100° C.), wherein the ratio of G' (25° C.) to G' (100° C.) is in the range of 1:1 to 9:1.

The olefin block copolymer may also have:

f) (F) a molecular fraction which elutes between 40° C. and 130° C. when fractionated using TREF, characterized in that the fraction has a block index of at least 0.5 and up to 1, and a molecular weight distribution, Mw/Mn, greater than 1.3; and/or g) (G) average block index greater than zero and up to 1.0 and a molecular weight distribution, Mw/Mn greater than 1.3. It is understood that the olefin block copolymer may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No. 7,608,668, Col. 31, line 26 through Col. 35, line 44, which is herein incorporated by reference for that purpose.

Suitable monomers for use in preparing the present OBC include ethylene and one or more addition polymerizable monomers other than ethylene. Examples of suitable comonomers include straight-chain or branched α-olefins of 3 to 30, preferably 3 to 20, carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cycloolefins of 3 to 30, preferably 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and polyolefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

In one embodiment, the ethylene/α-olefin block copolymer has a density of from 0.850 g/cc to 0.900 g/cc, or from 0.855 g/cc to 0.890 g/cc or from 0.860 g/cc to 0.880 g/cc. In one embodiment, the ethylene/α-olefin block copolymer has a Shore A value of 40 to 70, preferably from 45 to 65 and more preferably from 50 to 65. In an embodiment, the ethylene/α-olefin block copolymer has a melt index (MI or I2) from 0.1 g/10 min to 50 g/10 min, or from 0.3 g/10 min to 30 g/10 min, or from 0.5 g/10 min to 20 g/10 min, as measured by ASTM D 1238 (190° C./2.16 kg). In one embodiment, the ethylene/α-olefin block copolymer comprises polymerized ethylene and one α-olefin as the only monomer types. In a further embodiment, the α-olefin is selected from propylene, 1-butene, 1-hexene or 1-octene.

In one embodiment, the ethylene/α-olefin block copolymer has a density of from 0.850 g/cc to 0.900 g/cc, or from 0.855 g/cc to 0.890 g/cc or from 0.860 g/cc to 0.880 g/cc.

In an embodiment, the ethylene/α-olefin block copolymer has a melt index (MI or I2) from 0.5 g/10 min to 50 g/10 min, or from 0.7 g/10 min to 40 g/10 min, or from 0.8 g/10 min to 30 g/10 min, or from 1.0 g/10 min to 20 g/10 min, as measured by ASTM D 1238 (190° C./2.16 kg). In one embodiment, the ethylene/α-olefin block copolymer comprises polymerized ethylene and one α-olefin as the only monomer types. In a further embodiment, the α-olefin is selected from propylene, 1-butene, 1-hexene or 1-octene.

In an embodiment, the comonomer in the ethylene/α-olefin block copolymer is selected from propylene, butene, hexene, and octene.

In an embodiment, the ethylene/α-olefin block copolymer excludes styrene.

In an embodiment, the ethylene/α-olefin block copolymer is an ethylene/octene block copolymer.

The ethylene/α-olefin block copolymers can be produced via a chain shuttling process, such as described in U.S. Pat. No. 7,858,706, which is herein incorporated by reference. In particular, suitable chain shuttling agents and related information are listed in Col. 16, line 39, through Col. 19, line 44. Suitable catalysts are described in Col. 19, line 45, through Col. 46, line 19, and suitable co-catalysts in Col. 46, line 20, through Col. 51 line 28. The process is described throughout the document, but particularly in Col. Col 51, line 29, through Col. 54, line 56. The process is also described, for example, in the following: U.S. Pat. Nos. 7,608,668; 7,893, 166; and 7,947,793.

In one embodiment, the ethylene/α-olefin block copolymer has at least one of the following properties A through E:

(A) Mw/Mn from 1.7 to 3.5, at least one melting point, Tm, in degrees Celsius, and a density, d, in grams/cubic centimeter, where in the numerical values of Tm and d correspond to the relationship:

Tm>−2002.9+4538.5($d$)−2422.2($d$)$^2$, and/or (B) Mw/Mn from 1.7 to 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

ΔT>−0.1299Δ$H$+62.81 for Δ$H$ greater than zero and up to 130 J/g

ΔT≥48° C. for Δ$H$ greater than 130 J/g wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

Re>1481−1629($d$); and/or (D) has a molecular fraction which elutes between 40° C. and 130° C. when fractionated using TREF, characterized in that the fraction has a molar comonomer content greater than, or equal to, the quantity (−0.2013) T+20.07, more preferably greater than or equal to the quantity (−0.2013) T+21.07, where T is the numerical value of the peak elution temperature of the TREF fraction, measured in ° C.; and/or (E) has a storage modulus at 25° C., G' (25° C.), and a storage modulus at 100° C., G' (100° C.), wherein the ratio of G' (25° C.) to G' (100° C.) is in the range of 1:1 to 9:1.

The ethylene/α-olefin block copolymer may comprise a combination or two or more embodiments described herein.

B. Tackifier

The inventive composition comprises a tackifier. Typically, a tackifier is a resin that is used to reduce modulus and improve surface adhesion.

In one embodiment, the tackifier may be a non-hydrogenated aliphatic $C_5$ (five carbon atoms) resin, a hydrogenated aliphatic $C_5$ resin, an aromatic modified $C_5$ resin, a terpene resin, a hydrogenated $C_9$ resin, or combinations thereof.

In one embodiment, the tackifier has a density from 0.92 g/cc to 1.06 g/cc.

In one embodiment, the tackifier has a Ring and Ball softening temperature (measured in accordance with ASTM E 28) from 80° C. to 140° C., or from 85° C. to 130° C. or from 90° C. to 120° C., or from 90° C. to 100° C.

In one embodiment, the tackifier has a melt viscosity less than 1000 Pascal second (Pa·s) at 175° C. In a further embodiment, the tackifier has a melt viscosity greater than, or equal to, 1 Pascal second (Pa·s) at 175° C., further greater than, or equal to, 5 Pascal second (Pa·s) at 175° C.

In one embodiment, the tackifier has a melt viscosity less than 500 Pa·s at 175° C., or less than 200 Pa·s at 175° C., or less than 100 Pa·s at 175° C., or less than 50 Pa·s at 175° C. In a further embodiment, the tackifier has a melt viscosity from 1 Pa·s to less than 100 Pa·s, or to less than 50 Pa·s at 175° C.

The $C_5$ resin for a "C5 tackifier" may be obtained from $C_5$ feedstocks such as pentenes and piperylene. The terpene resin for a tackifier may be based on pinene and d-limonene feedstocks. Hydrogenated resin for a tackifier may be based on aromatic resins such as $C_9$ feedstocks, rosins, aliphatic or terpene feedstocks.

Nonlimiting examples of suitable tackifier include tackifiers sold under the tradename PICCOTAC, REGALITE, REGALREZ, and PICCOLYTE, such as PICCOTAC 1095, REGALITE R1090, REGALREZ 1094, available from The Eastman Chemical Company, and PICCOLYTE F-105 from PINOVA.

The tackifier may comprise a combination or two or more embodiments described herein.

C. Oil

An inventive composition may comprise an oil. In one embodiment, the oil contains greater than 95 mole % aliphatic carbons. In one embodiment, the glass transition temperature for the amorphous portion of the oil is below −70° C. The oil can be a mineral oil.

Nonlimiting examples of suitable oil include mineral oil sold under the tradenames HYDROBRITE 550 (Sonneborn), PARALUX 6001 (Chevron), KAYDOL (Sonneborn), BRITOL 50T (Sonneborn), CLARION 200 (Citgo), and CLARION 500 (Citgo). The oil may comprise a combination or two or more embodiments described herein.

D. Additive

An inventive composition may comprise one or more additives. Additives include, but are not limited to, antioxidants, ultraviolet absorbers, antistatic agents, pigments, viscosity modifiers, anti-block agents, release agents, fillers, coefficient of friction (COF) modifiers, induction heating particles, odor modifiers/absorbents, and any combination thereof. In one embodiment, the inventive composition further comprises one or more additional polymers. Additional polymers include, but are not limited to, ethylene-based polymers and propylene-based polymers.

Definitions

Unless stated to the contrary, implicit from the context, or customary in the art, all parts and percents are based on weight, and all test methods are current as of the filing date of this disclosure.

The term "composition," as used herein, includes material(s) which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure and/or within the bulk polymer), and the term interpolymer as defined hereinafter.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers. However, see exception for the term "copolymer" for the ethylene/α-olefin block copolymers discussed above.

The term, "ethylene-based polymer," as used herein, refers to a polymer that comprises a majority weight percent polymerized ethylene monomer (based on the total weight of the polymer), and optionally may comprise at least one polymerized comonomer.

The term, "ethylene/α-olefin interpolymer," as used herein, refers to an interpolymer that comprises, in polymerized form, a majority amount of ethylene monomer (based on the weight of the interpolymer), and at least one α-olefin that is randomly distributed within the interpolymer. Thus, this term does not include an ethylene/α-olefin block copolymer.

The term, "ethylene/α-olefin copolymer," as used herein, refers to a copolymer that comprises, in polymerized form, a majority amount of ethylene monomer (based on the weight of the copolymer), and an α-olefin, as the only two monomer types. The α-olefin is randomly distributed within the copolymer. Thus, this term does not include an ethylene/α-olefin block copolymer.

The term, "olefin-based polymer," as used herein, refers to a polymer that comprises, in polymerized form, a majority amount of olefin monomer, for example ethylene or propylene (based on the weight of the polymer), and optionally may comprise one or more comonomers.

The term "propylene-based polymer," as used herein, refers to a polymer that comprises, in polymerized form, a majority amount of propylene monomer (based on the total weight of the polymer) and optionally may comprise at least one polymerized comonomer.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

DSC

Differential Scanning calorimetry (DSC) is used to measure crystallinity in the ethylene (PE) based polymer samples and propylene (PP) based polymer samples. About five to eight milligrams of sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). For polymer samples (not formulations), the percent crystallinity is calculated by dividing the heat of fusion ($H_f$ or ΔH melting), determined from the second heat curve, by a theoretical heat of fusion of 292 J/g for PE (165 J/g, for PP), and multiplying this quantity by 100 (e.g., for PE, % cryst.=($H_f$/292 J/g)×100; and for PP, % cryst.=($H_f$/165 J/g)×100).

Unless otherwise stated, melting point(s) ($T_m$) of each polymer is determined from the second heat curve obtained from DSC, as described above (peak Tm). The glass transition temperature ($T_g$) is determined from the second heating curve. The crystallization temperature ($T_a$) is measured from the first cooling curve (peak Tc). The Delta H of crystallization was obtained from the first cooling curve and is calculated by integrating the area under the crystallization peak. The Delta H of melting was obtained from the second heat curve and is calculated by integrating the area under the melting peak.

Melt Index

Melt index for an ethylene-based polymer, or formulation, was measured in accordance with ASTM D 1238, condition 190° C./2.16 kg for I2, and 190° C./10 kg for I10. While melt flow rate (MFR) for a propylene-based polymer was measured in accordance with ASTM D1238, condition 230° C./2.16 kg.

Density

Samples (polymers and formulations) for density measurement were prepared according to ASTM D 1928. Measurements are made within one hour of sample pressing using ASTM D792, Method B.

GPC Method

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume is 100 microliters and the flow rate is 1.0 ml/minute.

Calibration of the GPC column set is performed with 21 narrow molecular weight distribution polystyrene standards with molecular weights ranging from 580 to 8,400,000 g/mole, arranged in six "cocktail" mixtures, with at least a decade of separation between individual molecular weights. The standards are purchased from Polymer Laboratories (Shropshire, UK). The polystyrene standards are prepared at "0.025 grams in 50 milliliters of solvent" for molecular weights equal to, or greater than, 1,000,000 g/mole, and "0.05 grams in 50 milliliters of solvent" for molecular weights less than 1,000,000 g/mole. The polystyrene standards are dissolved at 80° C. with gentle agitation for 30 minutes. The narrow standards mixtures are run first, and in order of decreasing highest molecular weight component, to minimize degradation. The polystyrene standard peak molecular weights are converted to polyethylene molecular weights using the following equation (as described in Williams and Ward, J. Polym. Sci., Polym. Let., 6, 621 (1968)): $M_{polyethylene}=0.431(M_{polystyrene})$. Polyethylene equivalent molecular weight calculations are performed using VISCOTEK TriSEC software Version 3.0.

DMS (Polymers and Formulations)

Dynamic Mechanical Spectroscopy (DMS) was measured on compression molded disks formed in a hot press at 180° C. at 10 MPa pressure for five minutes, and then water cooled in the press at 90° C./min. Testing was conducted using an ARES controlled strain rheometer (TA instruments) equipped with dual cantilever fixtures for torsion testing.

A "1.5 mm plaque" was pressed, and cut in a bar of dimensions 32 mm×12 mm (test sample). The test sample was clamped at both ends between fixtures separated by 10 mm (grip separation $\Delta L$), and subjected to successive temperature steps from −100° C. to 200° C. (5° C. per step). At each temperature, the torsion modulus G' was measured at an angular frequency of 10 rad/s, the strain amplitude being maintained between 0.1 percent and 4 percent, to ensure that the torque was sufficient and that the measurement remained in the linear regime.

An initial static force of 10 g was maintained (auto-tension mode) to prevent slack in the sample when thermal expansion occurred. As a consequence, the grip separation $\Delta L$ increased with the temperature, particularly above the melting or softening point of the polymer sample. The test stopped at the maximum temperature or when the gap between the fixtures reached 65 mm.

Adhesion

All adhesive tests (180° Peel and SAFT) use a test specimen that was prepared by blade coating 0.8-1 mil of adhesive formulation onto 2 mil polyester (PET) film, or other substrates as noted, to form a film laminate, except data in Table 10 (specific preparation discussed below—cast extrusion). The final assembly was cut into "one inch by six inch" strips (bond area "1 inch×6 inch"). All subsequent adhesive test methods were measured at controlled temperature and relative humidity (RH) (23° C. and 50% RH) conditions. The overlap areas for all subsequent tests were placed on a roll down machine (Cheminstruments RD-3000) and passed over twice (once in each direction) with a 4 lb weight, at a rate of 12 inches per minute. An INSTRON Model 5564 with BlueHill v.3 software was used to complete all peel tests.

Peel Force was a measure of the force required to remove the adhesive coated film from the substrate. Peel force was measured after a 20 minute dwell time at 23° C./50% RH (Relative Humidity) or a 24 hour dwell time at 23° C./50% RH (Relative Humidity), after the lamination step.

Screening 180° Peel Force-180° peel force was measured using Test method PSTC 101 Test method A, using stainless steel (2"×6", Chemsultants), a painted panel (3"×6", available from Test Panels Incorporated; PPG 343 primer, E86WE403 basecoat, and E126CD005 clearcoat), or an HDPE panel (McMaster-Carr Part#8619K446, cut to 2"×6" pieces). Film laminates were prepared as described in the experimental section. The release paper was removed, and the coated PET was adhered to the panel, and laminated using the roll down technique described above.

SAFT (Shear Adhesion Failure Temperature)

Each sample was prepared according to the ASTM D4498. The test was performed using a Gruenberg CS60H47. The hanging weight was one kg, and the sample lamination to the stainless steel panel was done similar to the previous adhesion tests. These data are shown in Table 1-7 and are reported as degrees Celsius.

Some embodiments of the present disclosure will now be described in detail in the following Examples.

Examples

Reagents

INFUSE 9107 Olefin Block Copolymer—OBC—Density of 0.866 g/cm³ and I2 of 1.0 g/10 min (190° C./2.16 kg). Available from The Dow Chemical Company.

INFUSE 9507 Olefin Block Copolymer—OBC—Density of 0.866 g/cm³ and I2 of 5.0 g/10 min (190° C./2.16 kg). Available from The Dow Chemical Company.

INFUSE 9807 Olefin Block Copolymer—OBC—Density of 0.866 g/cm³ and I2 of 15 g/10 min (190° C./2.16 kg). Available from The Dow Chemical Company.

INFUSE 9817 Olefin Block Copolymer—OBC—Density of 0.877 g/cm³ and I2 of 15 g/10 min (190° C./2.16 kg). Available from The Dow Chemical Company.

PICCOTAC 1095—C5 tackifier—Ring and ball softening point of 94° C. and $M_w$ of 1700, available from Eastman Chemical Company.

PICCOTAC 1100—C5 tackifier—Ring and ball softening point of 100° C. and $M_w$ of 2900, available from Eastman Chemical Company.

SONNEBORN HYDROBRITE 550—Mineral oil—Density of approximately 0.87 g/cm³ and Paraffinic carbon of approximately 70%.

CHEVRON PARALUX 6001—Mineral oil—Density of approximately 0.87 g/cm³ and Paraffinic carbon of approximately 70%.

IRGANOX 1010—Antioxidant—Pentaerythritol tetrakis (3-(3,5-di-tert-butyl-4-hydroxyphenyl)propionate).

DOW DX5E66—Polypropylene Resin—MFR of 8.7 g/10 min (230° C./2.16 kg). Available from Braskem.

DOW LDPE 50041—Low Density Polyethylene—Density of 0.924 g/cm³ and I2 of 4.2 g/10 min (190° C./2.16 kg)

DOW LDPE 7481—Low Density Polyethylene—Density of 0.920 g/cm³ and I2 of 7 g/10 min (190° C./2.16 kg).

ULTRAMID C33—polyamide—Density of 1.12 g/cm³.

DOWLEX 2038.68 Polyethylene Resin—Density of 0.935 g/cm³ and I2 of 1 g/10 min (190° C./2.16 kg). Available from The Dow Chemical Company.

AMPLIFY TY 1052H—MAH grafted PE tie layer concentrate—Density of 0.875 g/cm³ and I2 of 1.3 g/10 min (190° C./2.16 kg). Available from The Dow Chemical Company.

AMPLIFY TY 1053H—MAH grafted PE tie layer concentrate—Density of 0.958 g/cm³ and I2 of 2 g/10 min (190° C./2.16 kg). Available from The Dow Chemical Company.

ELITE 5960—High Density Polyethylene—Density of 0.960 g/cm³ and I2 of 0.85 g/10 min (190° C./2.16 kg). Available from The Dow Chemical Company.

BRASKEM PP 6D83K—Random copolymer polypropylene—MFR of 1.9 g/10 min (230° C./2.16 kg).

DOW DFDA-7059 NT 7 Linear Low Density Polyethylene Resin—Density of 0.918 g/cm$^3$ and I2 of 2 g/10 min (190° C./2.16 kg).

EVAL H171B—Ethylene Vinyl Alcohol—Density of 1.17 g/cm$^3$ and I2 of 1.7 g/10 min (190° C./2.16 kg).

AMPACET 10063—Antiblock masterbatch.

AMPACET 10090—Slip masterbatch.

ENGAGE 7447 Polyolefin Elastomer—Density of 0.865 g/cm$^3$ and I2 of 5.0 g/10 min (190° C./2.16 kg). Available from The Dow Chemical Company.

ENGAGE 8137 Polyolefin Elastomer—Density of 0.864 g/cm$^3$ and I2 of 13 g/10 min (190° C./2.16 kg). Available from The Dow Chemical Company.

VERSIFY 3401 Elastomer—Density of 0.865 g/cm$^3$ and MFR of 8.0 g/10 min (230° C./2.16 kg). Available from The Dow Chemical Company.

The formulations (approximately 10 grams total sample weight), in Table 1-7 were weighed into 5 dram glass vials, equipped with a blade stirrer and the vials were heated on a hot plate to 150° C., with stirring for 1 hour. Each formulation was then spread onto a "2 mil" untreated polyester film (PET substrate) from CHEMSULTANTS. The PET substrate was previously loaded onto a hot melt coating device (CHEMINSTRUMENTS LL-100 Laboratory Laminator) coupled to a blade coater.

The coating blade temperature was set to 130° C., and the coating plate temperature was set to 110° C. The CHEMINSTRUMENTS LL-100 Laboratory Laminator, set to 60 psi and to a 0.5 speed reading, was used to pull the 2 mil polyester film through the coater. Each formulation was coated onto a substrate at a coating thickness from 0.8 to 1 mil, and laminated to silicone coated release paper. The final laminate (PET facestock/formulation/paper) had a formulation coating thickness from 0.8 to 1 mil. A three or four inch wide film (formulation) was coated onto the substrate. The laminate was cut into "25 mm×150 mm" test samples. Each test sample was subject to adhesion testing using PSTC-101A.

For each test sample, the release paper was removed, and the coated PET was adhered to either stainless steel (2"×6", Chemsultants), a painted panel (3"×6", Test Panels Incorporated), or an HDPE panel (2"×6", McMaster-Carr), using a roll down machine—see Test Method section.

TABLE 1A

Formulations using INFUSE 9507, PICCOTAC 1095, and HYDROBRITE 550

| | | | | PET Facestock/Formulation/SS or Painted Panel | | | | | | | |
|---|---|---|---|---|---|---|---|---|---|---|---|
| Ex. | HYDROBRITE 550 | PICCOTAC 1095 | INFUSE 9507 | 180° Peel, (N/inch) SS, 20 min dwell | | 180° Peel (N/inch) SS, 24 hr dwell | | 180° Peel, (N/inch) Painted Panel, 20 min dwell | | 180° Peel, (N/inch) Painted Panel, 24 hr dwell | |
| 1  | 0.10  | 0.125 | 0.775 | 1.7 | A | 4.6  | C   | 1.5 | A | 1.9 | A   |
| 2  | 0.15  | 0.05  | 0.80  | 0.3 | A | 0.3  | A   | 0.3 | A | 0.2 | A   |
| 3  | 0.126 | 0.17  | 0.704 | 3.7 | C | 3.6  | A   | 2.1 | A | 3.2 | C   |
| 4  | 0.09  | 0.05  | 0.86  | 0.4 | A | 0.4  | A   | 0.3 | A | 0.2 | A   |
| 5  | 0.074 | 0.14  | 0.786 | 2.7 | A | 3.4  | A   | 6.2 | A | 6.8 | A   |
| 6  | 0.05  | 0.155 | 0.895 | 0.4 | A | 6.6  | C   | 5.1 | A | 6.7 | A   |
| 7  | 0.10  | 0.125 | 0.775 | 0.8 | A | 2.3  | A   | 2.5 | A | 3.4 | AFB |
| 8  | 0.05  | 0.05  | 0.90  | 0.4 | A | 0.9  | A   | 0.7 | A | 1.0 | A   |
| 9  | 0.05  | 0.20  | 0.75  | 9.6 | A | 13.5 | A   | 6.9 | A | 9.7 | A   |
| 10 | 0.09  | 0.20  | 0.71  | 8.8 | C | 11.1 | C   | 7.4 | A | 9.8 | A   |
| 11 | 0.15  | 0.125 | 0.725 | 0.8 | A | 1.5  | AFB | 1.4 | A | 1.4 | A   |
| 12 | 0.05  | 0.095 | 0.855 | 0.7 | A | 1.3  | A   | 2.1 | A | 2.7 | A   |
| 13 | 0.10  | 0.125 | 0.775 | 2.5 | A | 2.2  | AFB | 1.5 | A | 2.1 | A   |
| 14 | 0.12  | 0.08  | 0.80  | 0.7 | A | 1.0  | A   | 0.8 | A | 0.6 | A   |

A Adhesive from substrate
C Adhesive split on substrate and facestock
AFB Adhesive failure from facestock
SS Stainless Steel
Painted Panel Steel panels painted with white paint and clear coat on top

TABLE 1B

Estimated I2 and I10/I2 values based on experimental data in Table 11

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| I2 (g/10 min) | 16.4 | 16.3 | 22.4 | 9.9 | 14.7 | 13.2 | 16.4 | 5.7 | 16.5 | 20.7 | 21.7 | 8.9 | 16.4 | 15.2 |
| I10/I2 | 9.6 | 9.4 | 10.6 | 8.4 | 9.3 | 9.1 | 9.6 | 7.7 | 9.7 | 10.4 | 10.4 | 8.3 | 9.6 | 9.3 |

Table 1A lists formulations containing INFUSE 9507 as the olefin block copolymer (OBC), PICCOTAC 1095 as the tackifier, and HYDROBRITE 550 as the mineral oil. The OBC ranged from 70-90% by weight. The tackifier was varied from 5-20% by weight. The mineral oil was varied from 5-15% by weight.

Table 1B gives calculated I2 and I10/I2 values for each of the compositions in Table 1A. As seen in Table 1B, the I2 and I10/I2 values are inside the desirable ranges. The values in Table 1B were calculated using the outlining composition data in Table 11 and the JMP Pro 10.0.2 (available from SAS) statistics software. In this software, the "Mixture Design" (selected from the DOE dropdown menu) was used to evaluate the I2 and I10/I2 responses for the three component ranges given in Table 11 (INFUSE 9507 ranges from 65 to 90 wt %, PICCOTAC 1095 ranges from 5 to 20 wt %, and the HYDROBRITE 550 ranges from 5 to 15 wt %). In the software, the "Extreme Vertices" type was further selected using a "one" in the box to the right, which limits the design to the smallest subset (only the vertices). The experimental data (I2 and I10/I2) from Table 11 was added to a table generated by the software. All the formulations in Table 1A fall within the selected design. The design and data were then modeled using the program's modeling script. A standard least squares personality was used, and the emphasis was on effect leverage. The prediction formulas were then used to calculate the values in Table 1B.

The I2 prediction formula was as follows:

$$I2=5.65*((\text{INFUSE } 9507-0.65)/0.25)+23.65*((\text{PICCOTAC } 1095-0.05)/0.25)+32.15*((\text{HYDROBRITE } 550-0.05)/0.25).$$

The I10/I2 prediction formula was as follows:

$$I10/I2=7.7*((\text{INFUSE } 9507-0.65)/0.25)+11.0333333333333*((\text{PICCOTAC } 1095-0.05)/0.25)+11.95*((\text{HYDROBRITE } 550-0.05)/0.25).$$

Inputting the formulation from Example 8, as a representative example, gave an I2 and I10/I2 formula as follows:

$$I2(\text{in g/10 min})=5.65*((0.9-0.65)/0.25)+23.65*((0.05-0.05)/0.25)+32.15*((0.05-0.05)/0.25);$$
and
$$I10/I2=7.7*((0.9-0.65)/0.25)+11.0333333333333*((0.05-0.05)/0.25)+11.95*((0.05-0.05)/0.25).$$

The "I2 equation" gave an I2 of 5.65 or 5.7 g/10 min, when rounded to the first decimal place, and the "I10/I2 equation" gave an I10/I2 of 7.7, each as seen in Table 1B. This software approach can be used to evaluate other formulations. Also, the I2 and I10 melt indexes of a formulation can be measured using ASTM D 1238, as discussed above.

As discussed above, each formulation in Table 1A was coated onto a 2 mil polyester, untreated film, and the adhesion to several surfaces (stainless steel or painted panel) was tested, using a 180° Peel test as the representation of the adhesive force. It was found that by varying the ratios of OBC, tackifier, and oil, a wide range of adhesion was possible to stainless steel panels, as well as painted panels with a clear topcoat. Adhesion of greater than 13 N/inch was achievable using low levels of tackifier and oil.

Selected representative formulations, based on the results shown in Table 1A (three levels of adhesion (high, medium, and low)) were chosen to for further study. The formulations in Tables 2-4 used various amounts of the tackifier and OBC. Adhesion testing for Examples 15-47 used the "180° Peel test," as discussed above, on stainless steel and HDPE panels, along with SAFT testing (Examples 15-35). As seen in these tables, increasing the density of the OBC, decreased the adhesion to stainless steel (see Tables 2 and 3), while increasing the melt index of the OBC did not dramatically change the adhesion properties (see Tables 1, 2 and 4). Slightly increasing the softening point temperature of the tackifier has limited, or no, impact on adhesion properties, as seen in Table 3. Data shown in Table 2 also show that removal of the mineral oil is possible, although the adhesion to stainless steel was reduced. Increasing the melt index slightly decreased the SAFT (see Tables 2 and 4), while reducing the amount of mineral oil increased the SAFT (see Tables 2 and 3). Table 3 shows that, within a similar melt index range, increasing the density of the OBC does not affect the SAFT. Additional formulations are shown in Table 4.

TABLE 2

Formulations using INFUSE 9807, PICCOTAC 1100, and HYDROBRITE 550 show good balance of adhesion and SAFT

| | | | | 180° Peel, SS (N/inch) | | | | 180° Peel, HDPE (N/inch) | | | | | |
| --- | --- | --- | --- | --- | --- | --- | --- | --- | --- | --- | --- | --- | --- |
| | INFUSE | PICCOTAC | HYDROBRITE | 20 min | | 24 hr | | 20 min | | 24 hr | | SAFT (° C.) | |
| Ex. * | 9807 | 1100 | 550 | dwell | FM | dwell | FM | dwell | FM | dwell | FM | 1 | 2 |
| 15 | 74.1% | 19.3% | 6.6% | 3.2 | A | 8.7 | A | 1.2 | A | 1.1 | A | 106 | 107 |
| 16 | 81.4% | 11.7% | 6.9% | 2.7 | A | 6.2 | A | 0.7 | A | 1.1 | A | 105 | 106 |
| 17 | 77.0% | 9.3% | 13.7% | 2.9 | A | 2.3 | A | 0.4 | A | 0.3 | A | 92 | 86 |
| 18 | 79.3% | 20.7% | 0.0% | 1.4 | A | 5.3 | A | 1.3 | A | 2.0 | A | 119 | 111 |
| 19 | 87.4% | 12.6% | 0.0% | 3.5 | A | 5.1 | A | 0.5 | A | 0.5 | A | 123 | 126 |
| 20 | 89.2% | 10.8% | 0.0% | 1.0 | A | 4.5 | A | 0.2 | A | 0.3 | A | x | x |

FM = Failure Mode. See Table 1.

* The I2 value for composition 15 is estimated at 35-45 g/10 min; and the I10/I2 value is estimated at 9.4-10.4.

The I2 value for composition 16 is estimated at 25-35 g/10 min; and the I10/I2 value is estimated at 8.3-9.3.

The I2 value for composition 17 is estimated at 36-46 g/10 min; and the I10/I2 value is estimated at 8.9-9.9.

The I2 value for composition 18 is estimated at 30-45 g/10 min; and the I10/I2 value is estimated at 9.4-10.9.

The I2 value for composition 19 is estimated at 20-35 g/10 min; and the I10/I2 value is estimated at 8.3-9.8.

The I2 value for composition 20 is estimated at 31-46 g/10 min; and the I10/I2 value is estimated at 8.9-11.4.

Estimated ranges based on data in Table 8 (the I2 of INFUSE 9817 is the same the I2 of INFUSE 9807; the melt viscosity of PICCOTAC 1095 (10 poise at 160° C.) and PICCOTAC 1100 (10 poise at 170° C.) are almost identical, so the overall melt indexes (I2 and I10) should not be significantly different in similar compositions; removing the mineral oil from the "INFUSE 9807 samples" results in the I2 and I10 values of the composition determined primarily by the respective I2 and I10 values of the polymer, since tackifier is less efficient at lowering melt viscosity than mineral oil).

TABLE 3

Formulations using INFUSE 9817, PICCOTAC 1100, and HYDROBRITE 550 show good balance of adhesion and SAFT

|      |        |          |           | 180° Peel, SS (N/inch) | | | | 180° Peel, HDPE (N/inch) | | | | SAFT (° C.) | |
|------|--------|----------|-----------|------|----|------|----|------|----|------|----|-----|-----|
|      | INFUSE | PICCOTAC | HYDROBRITE | 20 min | | 24 hr | | 20 min | | 24 hr | | | |
| Ex*  | 9817   | 1100     | 550       | dwell | FM | dwell | FM | dwell | FM | dwell | FM | 1 | 2 |
| 21 | 74.1% | 19.3% | 6.6%  | 1.5 | A | 7.2 | A | 0.4 | A | 0.8 | A | 105 | 104 |
| 22 | 81.4% | 11.7% | 6.9%  | 1.7 | A | 3.7 | A | 0.2 | A | 0.2 | A | 95  | 99  |
| 23 | 77.0% | 9.3%  | 13.7% | 0.3 | A | 0.3 | A | 0.1 | A | 0.2 | A | 107 | 110 |

FM = Failure Mode. See Table 1.
*The I2 value for composition 21 is estimated at 35-45 g/10 min; and the I10/I2 value is estimated at 9.4-10.4.
The I2 value for composition 22 is estimated at 25-35 g/10 min; and the I10/I2 value is estimated at 8.3-9.3.
The I2 value for composition 23 is estimated at 36-46 g/10 min; and the I10/I2 value is estimated at 8.9-9.9.
Estimated ranges based on data in Table 8 (the I2 of INFUSE 9817 is the same the I2 of INFUSE 9807; the melt viscosity of PICCOTAC 1095 (10 poise at 160° C.) and PICCOTAC 1100 (10 poise at 170° C.) are almost identical, so the overall melt indexes (I2 and I10) should not be significantly different in similar compositions; removing the mineral oil from the "INFUSE 9807 samples" results in the I2 and I10 values of the composition determined primarily by the respective I2 and I10 values of the polymer, since tackifier is less efficient at lowering melt viscosity than mineral oil).

TABLE 4

Formulations using INFUSE 9507, PICCOTAC 1100, and HYDROBRITE 550 show good balance of adhesion and SAFT

|      |        |          |           | 180° Peel, SS (N/inch) | | | | 180° Peel, HDPE (N/inch) | | | | SAFT (° C.) | |
|------|--------|----------|-----------|------|----|------|----|------|----|------|----|-----|-----|
|      | INFUSE | PICCOTAC | HYDROBRITE | 20 min | | 24 hr | | 20 min | | 24 hr | | | |
| Ex.  | 9507   | 1100     | 550       | dwell | FM | dwell | FM | dwell | FM | dwell | FM | 1 | 2 |
| 24 | 74.1% | 19.3% | 6.6%  | 4.3 | A | 8.8 | A | 0.3 | A | 0.2 | A | 126 | 124 |
| 25 | 81.4% | 11.7% | 6.9%  | 4.6 | A | 8.5 | A | 0.4 | A | 0.4 | A | 120 | 120 |
| 26 | 77.0% | 9.3%  | 13.7% | 3.3 | A | 2.5 | A | 0.1 | A | 0.2 | A | 109 | 112 |

FM = Failure Mode. See Table 1.
*The I2 value for composition 24 is estimated at 7-17 g/10 min; and the I10/I2 value is estimated at 8.9-9.9.
*The I2 value for composition 25 is estimated at 5-15 g/10 min; and the I10/I2 value is estimated at 8.4-9.4.
*The I2 value for composition 26 is estimated at 10-20 g/10 min; and the I10/I2 value is estimated at 8.8-9.8.
Estimated ranges based on data in Table 8 (the I2 of INFUSE 9817 is the same the I2 of INFUSE 9807; the melt viscosity of PICCOTAC 1095 (10 poise at 160° C.) and PICCOTAC 1100 (10 poise at 170° C.) are almost identical, so the overall melt indexes (I2 and I10) should not be significantly different in similar compositions; removing the mineral oil from the "INFUSE 9807 samples" results in the I2 and I10 values of the composition determined primarily by the respective I2 and I10 values of the polymer, since tackifier is less efficient at lowering melt viscosity than mineral oil).

Tables 5-7 show data of various random copolymers generated from adhesion test samples, prepared and tested the same way as the samples in Table 1A above. As seen in these tables, the formulations show a poor balance of SAFT and peel. As seen in Tables 5 and 6, the formulations have low SAFT, even when formulated with higher amounts of tackifier. The formulations shown in Table 7 do have comparable peel and SAFT, however, compared to OBC-based formulations, these other polymer-based formulations have narrower ranges of component amounts that provide acceptable adhesion levels.

TABLE 5

Formulations using ENGAGE 7447, PICCOTAC 1100, and HYDROBRITE 550

|      |        |          |           | 180° Peel, SS (N/inch) | | | | 180° Peel, HDPE (N/inch) | | | | SAFT (° C.) | |
|------|--------|----------|-----------|------|----|------|----|------|----|------|----|-----|-----|
|      | ENGAGE | PICCOTAC | HYDROBRITE | 20 min | | 24 hr | | 20 min | | 24 hr | | | |
| Ex.  | 7447   | 1100     | 550       | dwell | FM | dwell | FM | dwell | FM | dwell | FM | 1 | 2 |
| 27 | 74.1% | 19.3% | 6.6%  | 0.1 | A | 8.7 | A | 0.1 | A | 0.3 | A | 67  | 64  |
| 28 | 81.4% | 11.7% | 6.9%  | 0.5 | A | 1.1 | A | 0.3 | A | 0.3 | A | 101 | 101 |
| 29 | 77.0% | 9.3%  | 13.7% | 0.1 | A | 0.3 | A | 0.1 | A | 0.1 | A | x   | x   |

FM = Failure Mode. See Table 1.
x: Not tested.

TABLE 6

Formulations using ENGAGE 8137, PICCOTAC 1100, and HYDROBRITE 550

| | | | | 180° Peel, SS (N/inch) | | | | 180° Peel, HDPE (N/inch) | | | | SAFT | |
|---|---|---|---|---|---|---|---|---|---|---|---|---|---|
| | ENGAGE | PICCOTAC | HYDROBRITE | 20 min | | 24 hr | | 20 min | | 24 hr | | | |
| Ex. | 8137 | 1100 | 550 | dwell | FM | dwell | FM | dwell | FM | dwell | FM | 1 | 2 |
| 30 | 74.1% | 19.3% | 6.6% | 0.2 | A | 0.3 | A | 0.2 | A | 0.1 | A | x | x |
| 31 | 81.4% | 11.7% | 6.9% | 0.3 | A | 0.7 | A | 0.2 | A | 0.1 | A | 78 | 78 |
| 32 | 77.0% | 9.3% | 13.7% | 0.1 | A | 0.3 | A | 0.1 | A | 0.1 | A | x | x |

FM = Failure Mode. See Table 1.
x: Not tested.

TABLE 7

Formulations using VERSIFY 3401, PICCOTAC 1100, and HYDROBRITE 550

| | | | | 180° Peel, SS (N/inch) | | | | 180° Peel, HDPE (N/inch) | | | | SAFT | |
|---|---|---|---|---|---|---|---|---|---|---|---|---|---|
| | VERSIFY | PICCOTAC | HYDROBRITE | 20 min | | 24 hr | | 20 min | | 24 hr | | | |
| Ex. | 3401 | 1100 | 550 | dwell | FM | dwell | FM | dwell | FM | dwell | FM | 1 | 2 |
| 33 | 74.1% | 19.3% | 6.6% | 1.6 | A | 7.2 | A | 0.3 | A | 0.3 | A | 110 | 111 |
| 34 | 81.4% | 11.7% | 6.9% | 0.2 | A | 1.1 | A | 0.1 | A | 0.3 | A | 102 | 101 |
| 35 | 77.0% | 9.3% | 13.7% | 0.1 | A | 0.1 | A | 0.2 | A | 0.2 | A | 113 | 121 |

FM = Failure Mode. See Table 1.

Several formulations were prepared using a twin screw extruder, and then tested for melt index and density (Table 8). The formulations shown in Table 8 were prepared by a single step twin screw extrusion process. The formulation components, in wt %, are listed in Table 8. The compounding operation was performed on a COPERION ZSK-25, 25-mm, co-rotating twin screw extruder. The extruder had a total length-to-diameter ratio (L/D) of 48. The extruder was equipped with a 24 kW motor, and had a maximum screw speed of 1200 RPM. The feed system for this extrusion line consisted of two "loss-in-weight" feeders. The polymer precursor was fed into the main feed throat of the extruder using a K-TRON KCLQX3 single-screw feeder. PICCOTAC tackifier was feed into the side arm at barrel 5. The PARALUX process oil was added through an injection port at barrel 4 using a Leistritz Gear Pump. The compound was pelletized, using an underwater pelletization unit with a t-hole die. The pellets were collected, and dusted with 2000 ppm POLYWAX 2000 (available from Baker Hughes), and then dried under nitrogen purge for 24 hours. The screw speed was set at 300 RPM for all the samples. The temperature profile was set as follows: 100° C. (zone 1), 120° C. (zone 2), 140° C. (zone 3), 140° C. (zone 4), 110° C. (zone 5), 100° C. (zone 6), 110° C. (zone 7).

The examples below used several OBCs with different melt indexes. PICCOTAC 1095 was used as the tackifier, and PARALUX 6001 was used as the mineral oil. These formulated compositions range in I2 values from around 2 to around 40 gram/10 minute (190° C. at 2.16 kg), with densities around 0.88 g/cc. The formulated compositions can be extruded in cast or blown film lines, and can be extrusion coated onto substrates, and used in other hot melt coating techniques. The formulations had very low Tg, making them suitable for adhesive applications over broad temperature ranges. See Table 9. The inventive formulations can also be pelletized.

TABLE 8

Formulations Blended using Twin Screw Extruder

| Ex. | INFUSE Grade | INFUSE | PICCOTAC 1095 | PARALUX 6001 | Density | I2 (g/10 min) | I10 (g/10 min) | I10/I2 |
|---|---|---|---|---|---|---|---|---|
| 36 | 9107 | 74.1% | 19.3% | 6.6% | 0.884 | 3.3 | 32.5 | 9.9 |
| 37 | 9107 | 81.4% | 11.7% | 6.9% | 0.877 | 2.3 | 20.6 | 8.8 |
| 38 | 9107 | 77.0% | 9.3% | 13.7% | 0.875 | 3.3 | 31.7 | 9.6 |
| 39 | 9507 | 74.1% | 19.3% | 6.6% | 0.884 | 13.7 | 128.4 | 9.4 |
| 40 | 9507 | 81.4% | 11.7% | 6.9% | 0.882 | 10.3 | 92.2 | 8.9 |
| 41 | 9507 | 77.0% | 9.3% | 13.7% | 0.877 | 14.8 | 137.1 | 9.3 |
| 42 | 9807 | 74.1% | 19.3% | 6.6% | 0.888 | 41.3 | 411.1 | 9.9 |
| 43 | 9807 | 81.4% | 11.7% | 6.9% | 0.879 | 31.6 | 277.7 | 8.8 |
| 44 | 9807 | 77.0% | 9.3% | 13.7% | 0.880 | 42.6 | 398.6 | 9.4 |

TABLE 9

DSC and DMS Data of Formulations Blended using Twin Screw Extruder

| Ex. | Tc (° C.) | Delta H cryst (J/g) | Tg (° C.) | Tm (° C.) | Delta H melt (J/g) | G' @ 25° C. (dyne/cm²)* |
|---|---|---|---|---|---|---|
| 36 | 104.51 | 23.6 | -54.26 | 119.35 | 30.39 | 1.5 × 10⁷ |
| 37 | 108.01 | 26.15 | -58.83 | 119.65 | 28.87 | 0.5 × 10⁷ |
| 38 | 106.75 | 29.54 | -60.25 | 119.21 | 24.21 | 0.5 × 10⁷ |
| 39 | 110.15 | 23.45 | -55.49 | 121.14 | 22.49 | 1.3 × 10⁷ |
| 40 | 111.28 | 26.48 | -57.81 | 121.82 | 25.53 | 1.5 × 10⁷ |
| 41 | 111.05 | 25.16 | -59.44 | 121.2 | 24.80 | 1.4 × 10⁷ |
| 42 | 112.42 | 23.39 | -54.85 | 121.15 | 22.33 | 1.3 × 10⁷ |
| 43 | 113 | 25.65 | -59.04 | 121.6 | 26.16 | 2.0 × 10⁷ |
| 44 | 112.39 | 26.71 | -59.12 | 120.98 | 23.81 | 1.6 × 10⁷ |

*From DMS data.

The adhesive peel data, given in Table 10, follows the same peel force test method, PSTC 101A. Examples 36-38 were co-extruded with a propylene-based polymer (Dow DX5E66) on a three layer cast film line (see Examples 45-47). The adhesive was extruded as the inside layer (C), while the outer layers (A and B), in an A/C/B film configuration, were the extruded propylene-based polymer. The cast extruded structures were produced using a Collins three layer cast extrusion line, with two "25 mm extruders" and one "30 mm extruder." Each extruder was run at a temperature typical for either polypropylene or polyethylene depending on the material. The temperature profile for Extruder A, zones 1-8, were as follows: 54° C., 220° C., 225° C., 230° C., 235° C., 235° C., 230° C., 230° C., respectively. The temperature profile for Extruder B, zones 1-8, were as follows: 43° C., 220° C., 225° C., 230° C., 235° C., 235° C., 230° C., 230° C., respectively. The temperature profile for Extruder C, zones 1-8, were as follows: 49° C., 100° C., 180° C., 200° C., 220° C., 230° C., 230° C., 230° C., respectively. The die gap was 20 mil, and this produced a 2 mil thick by 7.25 inch wide total structure, with the following layer thicknesses: A (0.5 mil), B (1.0 mil), and C (0.5 mil). The take off rollers that faced layer C (adhesive layer) were wrapped with masking tape to provide release, however, release paper or silicone rollers would also work. The film was self-wound on the uptake rollers.

The 'tape' or adhesive film, was collected, and tested for adhesion in the same way that the previous small scale examples were performed. The self-wound rolls were unwound, and the film was cut into "one inch by six inch" strips to conform with the test method. Similar structures using the same adhesive, but with polyethylene resins as the outer layers were also made, and showed similar adhesion. See Table 10.

TABLE 10

Formulated OBCs cast extruded on Collins Three Layers with DX5E66 polypropylene as remainder of structure

| | 180° Peel, SS (N/inch) | | | | 180° Peel, HDPE (N/inch) | | | |
|---|---|---|---|---|---|---|---|---|
| Ex. | 20 Min Dwell | | 24 hour Dwell | | 20 Min Dwell | | 24 hour Dwell | |
| 45 | 3.0 | A | 3.2 | A | 1.7 | A | 2.2 | A |
| 46 | 4.5 | A | 5.3 | A | 0.8 | A | 1.1 | A |
| 47 | 7.5 | A | 8.7 | A | 3.2 | A | 2.6 | A |

The four corners of the design space covered in Table 1A were analyzed for melt index, density and other physical properties. They are reported in Tables 11 and 12. All the samples in Table 1A should reasonably fall within the ranges found with these 4 corner examples (48-51). These formulations were made using a 3000E Haake bowl mixer. The components were weighed out at the ratios listed in Table 11, to make a "200 gram" total sample. The HYDROBRITE 550 and INFUSE 9507 were heated in an oven, for 7 days at 51° C., to help imbibe the oil into the polymer, to facilitate the mixing in the Haake bowl, where the PICCOTAC 1095 was then added. The bowl was heated at 160° C., and 80 RPM shear was used for 5 minutes, after the tackifier was added.

TABLE 11

Formulations Blended with Haake Bowl Mixer

| Ex. | INFUSE 9507 | PICCOTAC 1095 | HYDROBRITE 550 | Density | I2 (g/10 min) | I10 (g/10 min) | I10/I2 |
|---|---|---|---|---|---|---|---|
| 48 | 75 | 20 | 5 | 0.885 | 14.1 | 134.5 | 9.5 |
| 49 | 90 | 5 | 5 | 0.872 | 8.0 | 63.2 | 7.9 |
| 50 | 80 | 5 | 15 | 0.872 | 13.9 | 128.2 | 9.2 |
| 51 | 65 | 20 | 15 | 0.884 | 29.4 | 341.8 | 11.6 |

TABLE 12

DSC and DMS Data of Formulations Blended using Haake Bowl Mixer

| Ex. | Tc (° C.) | Delta H cryst (J/g) | Tg (° C.) | Tm (° C.) | Delta H melt (J/g) | G' @ 25° C. (dyne/cm²)* |
|---|---|---|---|---|---|---|
| 48 | 107.89 | 30.69 | -51.71 | 120.07 | 34.64 | 0.5 × 10⁷ |
| 49 | 109.94 | 30.63 | -59.65 | 121.29 | 34.03 | 1.7 × 10⁷ |
| 50 | 108.73 | 24.92 | -62.00 | 119.91 | 28.49 | 5.9 × 10⁷ |
| 51 | 106.28 | 25.14 | -53.14 | 118.62 | 28.34 | 7.7 × 10⁷ |

*From DMS data

Several comparative compositions (Examples 52-59) were prepared, in addition to the ones described above in Tables 5-7. They were compounded in the same way as Examples 48-51. The samples were split with some going to physical testing (Tables 14 and 16) and the rest of the sample then pressed onto 2 mil PET for adhesive testing (results in Table 15), using a MTP140 Tetrahedron Press, with the conditions shown in Table 13. The samples were pressed to approximately 2 mil thick, by using a 2 mil brass template to set the gap during the pressing process. A sandwich of PET film, sample with brass template, and silicone release paper was prepared. The release paper was then removed from the sample, along with the brass template, and the resulting sample was cut into strips, in accordance with the adhesion testing description above, and tested following the same protocol.

TABLE 13

Conditions Used on MTP140 Tetrahedron Press

| Step | Temp | Temp Rate | Force | Force Rate | Tool Temp | Time |
|---|---|---|---|---|---|---|
| 1 | 266 | 200 | 0.0 | 700 | off | 00:00:00 |
| 2 | 266 | 200 | 0.4 | 700 | off | 00:05:00 |
| 3 | 266 | 200 | 45.0 | 700 | off | 00:06:00 |
| 4 | 120 | 200 | 45.0 | 700 | off | 00:03:00 |
| END | | | | | | |
| | °F. | °F./min | KLB | KLB/min | °F. | HR:MN:SC |

TABLE 14

Comparative Examples Blended with Haake Bowl Mixer

| Ex. | INFUSE 9007 | INFUSE 9107 | INFUSE 9807 | Piccotac 1095 | Hydrobrite 550 | I2 (g/10 min) | I10 (g/10 min) | I10/I2 | Density |
|---|---|---|---|---|---|---|---|---|---|
| 52 | | 60 | | 40 | | 5.7 | 76.2 | 13.4 | 0.901 |
| 53 | | 60 | | | 40 | 13.5 | 192.5 | 14.3 | 0.868 |
| 54 | 97 | | | 3 | | 0.6 | 4.4 | 7.3 | 0.871 |
| 55 | 97 | | | | 3 | 0.6 | 4.7 | 7.8 | 0.869 |
| 56 | | | 98 | 2 | | 16.0 | 117.9 | 7.4 | 0.871 |
| 57 | | | 98 | | 2 | 16.6 | 122.6 | 7.4 | 0.869 |
| 58 | | | 65 | 35 | | 55.4 | 575.3 | 10.4 | 0.895 |
| 59 | | | 70 | | 30 | 76.1 | 762.2 | 10.0 | 0.868 |

TABLE 15

Adhesion Data for Comparative Examples

PET Facestock/Formulation/SS or Painted Panel

| Ex. | 180° Peel, N/inch SS, 20 min dwell | | 180° Peel, N/inch SS, 24 hr dwell | | 180° Peel, N/inch Painted Panel, 20 min dwell | | 180° Peel, N/inch Painted Panel, 24 hr dwell | |
|---|---|---|---|---|---|---|---|---|
| 52 | 10.9 | A | 16.5 | A | 10.6 | A | 15.9 | A |
| 53 | 0.1 | A | 0.1 | A | 0.2 | A | 0.2 | A |
| 54 | 0.0 | A | 0.0 | A | 0.1 | A | 0.1 | A |
| 55 | 0.0 | A | 0.0 | A | 0.1 | A | 0.0 | A |
| 56 | 0.2 | A | 0.2 | A | 0.2 | A | 0.1 | A |
| 57 | 0.0 | A | 0.0 | A | 0.2 | A | 0.3 | A |
| 58 | 14.1 | A | 17.8 | A | 18.1 | A | 22.6 | A |
| 59 | 0.2 | A | 0.1 | A | 0.1 | A | 0.1 | A |

TABLE 16

DSC and DMS Data of Comparative Examples Blended using Haake Bowl Mixer

| Ex. | Tc (°C.) | Delta H cryst (J/g) | Tg (°C.) | Tm (°C.) | Delta H melt (J/g) | G' @ 25°C. (dyne/cm$^2$)* |
|---|---|---|---|---|---|---|
| 52 | 101.16 | 15.55 | −38.90 | 118.57 | 27.49 | 0.6 × 10$^7$ |
| 53 | 102.30 | 23.95 | −66.85 | 116.69 | 27.31 | 0.5 × 10$^7$ |
| 54 | 97.96 | 35.84 | −59.79 | 118.09 | 35.37 | 1.5 × 10$^7$ |
| 55 | 98.27 | 34.15 | −61.13 | 118.01 | 32.57 | 1.7 × 10$^7$ |
| 56 | 111.96 | 34.94 | −59.34 | 122.16 | 37.04 | 8.7 × 10$^7$ |
| 57 | 111.51 | 32.11 | −60.41 | 122.49 | 34.80 | 1.4 × 10$^7$ |
| 58 | 108.14 | 28.55 | −50.24 | 119.83 | 30.07 | 0.6 × 10$^7$ |
| 59 | 108.69 | 25.09 | −65.39 | 118.44 | 25.71 | 1.4 × 10$^7$ |

*From DMS data

Examples 52 and 53 were prepared using tackifier and oil respectively in amounts higher than are preferred and show that the resulting melt flow is sufficient for the I2, but the I10/I2 ratio is high, indicating difficulty in processing on a co-extrusion line. Also the adhesion, at 24 hours, for these two examples is either too high adhesion for a protective wrap application (see Example 52; protective wrap could remove surface paint or other surface treatments), or too low (see Example 53; protective wrap does not adhere well to article surface).

Examples 54-57 are various formulations with either I2 or I10/I2 ratio outside the preferred ranges, but illustrate that without careful choice of component amounts the adhesion will be too low to work in most applications.

Examples 58 and 59 are similar to 52 and 53, respectively, in their poor adhesion performance for protective wrap applications, and illustrate that both the I2 and I10/I2 ratio need to be within the preferred ranges to have a composition with good processing performance. Examples 58 and 59 have a good I10/I2 ratio but the I2 is too high to process well on a co-extrusion line.

The invention claimed is:

1. A composition comprising the following components:
   A) an ethylene/α-olefin block copolymer that has a melt index (I2) from 0.5 to 20 g/10 min;
   B) a tackifier; and
   wherein the composition has a melt index (I2) from 1 to 50 g/10 min, and an I10/I2 ratio from 7.5 to 13; and
   wherein component A is present in an amount from 65 to 90 weight percent, based on the weight of the composition; and wherein component B is present in an amount from 5 to 30 weight percent, based on the weight of the composition.

2. The composition of claim 1, wherein the composition further comprises component C), an oil.

3. The composition of claim 2, wherein component C is present in an amount from 2 to 25 weight percent, based on the weight of the composition.

4. The composition of claim 1, wherein the composition has a density from 0.860 to 0.900 g/cc.

5. The composition of claim 1, wherein the composition has a PSTC (PSCT-101, method A; N/in) from 0.4 to 14.0 N/in, after a 24 hour dwell period at 23° C./50% RH.

6. The composition of claim 1, wherein the composition has a glass transition temperature (Tg) from −70° C. to −20° C.

7. The composition of claim 1, wherein the composition has a melting temperature (Tm) from 110° C. to 130° C.

8. The composition of claim 1, wherein the composition has a crystallization temperature (Tc) from 100° C. to 120° C.

9. An article comprising at least one component formed from the composition of claim 1.

10. The composition of claim 1, wherein component B is present in an amount from 7 to 25 weight percent, based on the weight of the composition.

11. The composition of claim 1, wherein component B is present in an amount from 9 to 20 weight percent, based on the weight of the composition.

12. The composition of claim 1, wherein the composition has a melt index (I2) from 3 to 50 g/10 min.

13. The composition of claim 1, wherein the composition has a melt index (I2) from 5 to 50 g/10 min.

14. The composition of claim 1, wherein component A is present in an amount from 70 to 90 weight percent, based on the weight of the composition.

15. The composition of claim 1, wherein component A is present in an amount from 70 to 85 weight percent, based on the weight of the composition.

\* \* \* \* \*